(12) United States Patent
Li

(10) Patent No.: US 12,228,915 B2
(45) Date of Patent: Feb. 18, 2025

(54) CONFIGURABLE MEDIA INTERFACE MODULE

(71) Applicant: ROCKWELL AUTOMATION TECHNOLOGIES, INC., Mayfield Heights, OH (US)

(72) Inventor: Jianxin J. Li, Singapore (SG)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 524 days.

(21) Appl. No.: 17/519,736

(22) Filed: Nov. 5, 2021

(65) Prior Publication Data

US 2023/0145749 A1 May 11, 2023

(51) Int. Cl.
  *G05B 19/418* (2006.01)
  *H02J 11/00* (2006.01)
(52) U.S. Cl.
  CPC ...... *G05B 19/4185* (2013.01); *G05B 19/41845* (2013.01); *H02J 11/00* (2013.01)
(58) Field of Classification Search
  CPC .......... G05B 19/41845; G05B 19/4185; H04L 12/10; H02J 1/001; H02J 11/00
  See application file for complete search history.

(56) References Cited

U.S. PATENT DOCUMENTS

| | | | |
|---|---|---|---|
| 2009/0019296 A1* | 1/2009 | Huang | H04L 12/10 713/310 |
| 2018/0027054 A1* | 1/2018 | Toepke | H04L 69/22 709/222 |
| 2018/0212377 A1* | 7/2018 | Zimmermann | H01R 24/64 |
| 2019/0190240 A1* | 6/2019 | Kroushl | H02B 1/14 |

OTHER PUBLICATIONS

Extended European Search Report for Application No. 22205344.9 mailed Apr. 6, 2023, 6 pages.
Rockwell Automation, "Installation Instructions Process Remote I/O (RIO) Communication Interface Module," Mar. 31, 2008, https://literature.rockwellautomation.com/idc/groups/literature/documents/in/1757-in916_-en-p.pdf, retrieved on Mar. 29, 2023, 16 pages.
Vincent, "SFP Module: What's It and and How to Choose It?," May 7, 2013, Last Accessed Nov. 4, 2021, https://community.fs.com/blog/sfp-module-what-is-it-and-how-to-choose-it.html.

\* cited by examiner

*Primary Examiner* — Tameem D Siddiquee
(74) *Attorney, Agent, or Firm* — Fletcher Yoder, P.C.

(57) ABSTRACT

In an embodiment, a method includes transmitting power to a media interface module via a base and receiving device information associated with any number of devices. The devices are connected to any number of communication ports of the media interface module. The method also includes configuring any number of network connections between the media interface module and the host device based on the device information. The method also includes establishing any number of communication sessions between the devices and the host device via the communication ports after the network connections are configured.

20 Claims, 6 Drawing Sheets

CONFIGURABLE MEDIA INTERFACE MODULE

BACKGROUND

The present disclosure relates generally to data communication, and particularly to configurable media interface modules that provide communication between components of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial automation system may include a variety of components that may be adapted to provide communication and feedback of data and key system parameters. Such communication is particularly important in the field of industrial automation where real or near real time demands are beneficial for control operations.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a base, a host device capable of coupling to the base, and a media interface module capable of coupling to the base. The media interface module receives power from the host device via the base and detects a position of an attenuation latch. The media interface module also supplies the power to one or more components of the media interface module based on the position and transmits device information associated with one or more devices coupled to one or more communication ports of the media interface module to the host device. The host device configures one or more network connections between the media interface module and the host device based on the device information. The media interface module also facilitates one or more communication sessions between the one or more devices and the host device via the one or more communication ports after the one or more network connections is configured by the host device.

In another embodiment, a method includes transmitting power to a media interface module via a base and receiving device information associated with one or more devices coupled to one or more communication ports of the media interface module. The method also includes configuring one or more network connections between the media interface module and the host device based on the device information and establishing one or more communication sessions between the one or more devices and the host device via the one or more communication ports after the one or more network connections is configured.

In yet another embodiment, a non-transitory, processor-readable medium comprising instructions, that when executed by a processor, are configured to cause the processor to perform actions including receiving power from a host device, detecting a position of an attenuation latch, and supplying the power to one or more components of a media interface module based on the position. The instructions, when executed by the processor, are configured to cause the processor to perform additional actions including transmitting device information associated with one or more devices coupled to one or more communication ports of the media interface module to the host device and facilitating one or more communication sessions between the one or more devices and the host device via the one or more communication ports after the one or more network connections is configured by the host device. In the embodiment, the host device configures one or more network connections between the media interface module and the host device based on the device information.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
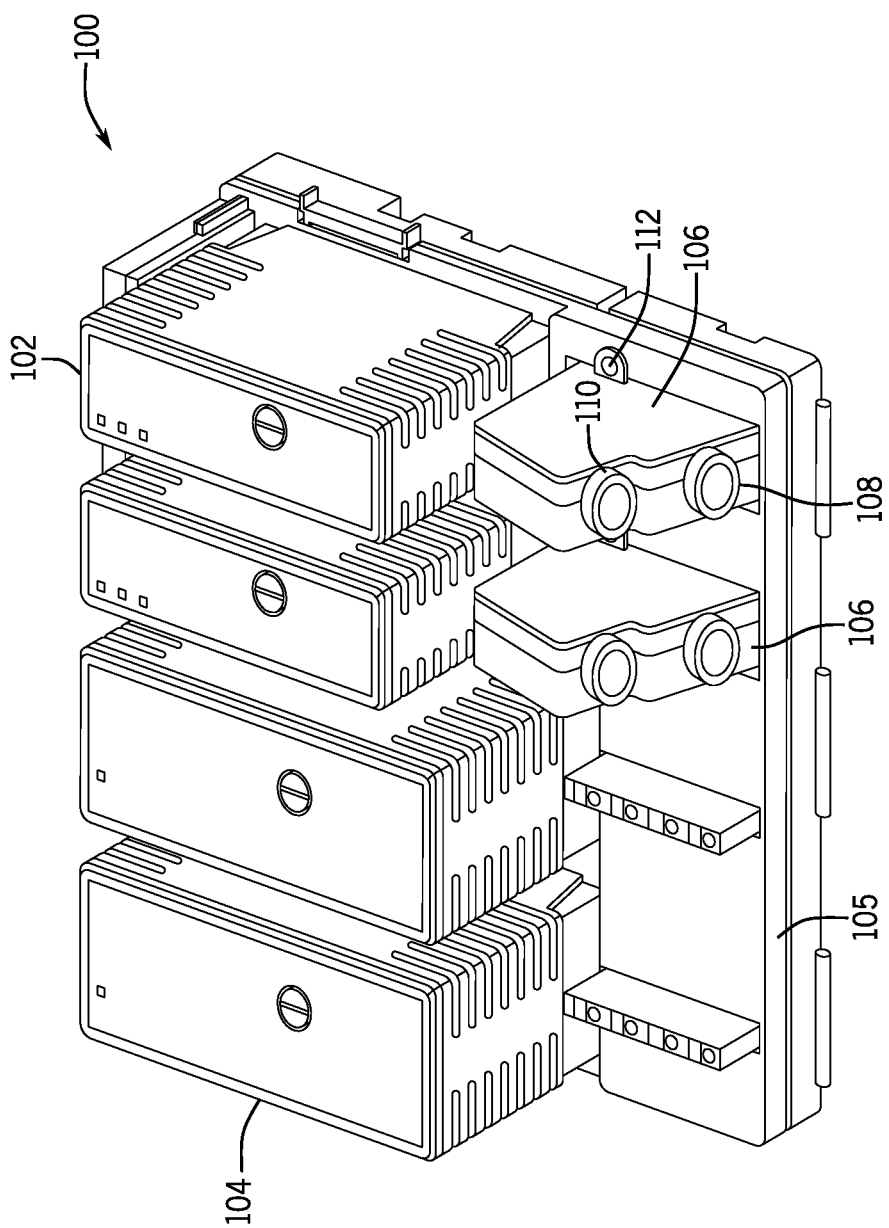
FIG. 1 is a perspective view of an exemplary system including a configurable media interface module, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," including," and "having" are intended to be inclusive and mean that there may be additional elements other than the listed elements. As used herein, "host device" refers to a device that communicates with other devices on a network and may facilitate access to the network for external devices. As used herein, "hot swapping" refers to the replacement or addition of components to a system without stopping, shutting down, or rebooting the system. Additionally, as used herein, "hot plugging" refers only to the addition of components to a system without stopping, shutting down, or rebooting the system.

An industrial automation system may include automation control and monitoring systems. The automation control and monitoring systems may monitor statuses and/or receive information from a wide range of devices, such as valves, electric motors, a wide range of sensors, other suitable monitoring devices, and the like. To improve operation of industrial automation systems, components of the industrial automation system may monitor performance of one or more devices with respect to the industrial automation process as a whole. Statuses and/or information from the one or more components may be transmitted to respective control systems of drives associated with the one or more devices via an Ethernet network. Respective control systems may use the statuses and/or information to make control decisions related to the one or more devices controlled or coupled to the drive. To enable the components to receive statuses and/or information from the one or more devices, each device may be connected to a network, such as an Ethernet network.

Network communications may be transmitted and received through network cables or media, such as fiber optic cables, copper cables, and so forth. The network cables may connect to and terminate at devices in the network via communication ports. In certain instances, the communication ports may be designed and adapted for use based on the corresponding media. For example, a twisted pair cable, such as a Category 5 (CAT5) cable or Category 6 (CAT6) cable, may connect to an 8 position 8 contact (8P8C) communication port, such as a registered jack (RJ) 45 communication port. As another example, a fiber-optic cable or copper cable may connect to a small form-factor pluggable (SFP) communication port. As yet another example, a twisted pair cable may connect to an M12 communication port, such as an M12 D coded or M12 X coded communication port.

Each network communications media may have corresponding transmission properties, such as impedance, conductor resistance, attenuation, propagation delay, bandwidth, and so forth. In some instances, the media and corresponding communication ports may be selected based on specific application and/or device requirements. Accordingly, the media and communication ports may be changed or switched to fit the corresponding application and/or device requirements. Typically, a host device incorporates the communication port(s) and, as such, may be shutdown to provide the host device with the selected communication port(s) and/or install a separate host device with the selected communication port(s). After installation, the host device may be reconfigured and rebooted. Thus, changing or switching out communication ports based on desired media, specific application requirements, specific device requirements, or any combination thereof may result in operational delays.

Keeping the foregoing in mind, a configurable media interface module may be separate from the host device and may include communicative couplings to allow the host device to facilitate access to the network. The configurable media interface module may include any number of communication ports and each communication port may be the same as or different from at least one other communication port. As such, the configurable media interface module may support different communication ports. Different configurable media interface modules may be interchangeable to provide different communication ports and/or different combinations of communication ports. Additionally, the configurable media interface modules may support hot swapping and/or hot plugging to remove and/or replace different configurable media interface modules without shutting down and rebooting the system. Additional details with regard to coordinating operations between configurable media interface modules and a host device will be discussed below with reference to FIGS. 1-6.

By way of introduction, FIG. 1 illustrates a system 100 including a host device 102, a power conditioner 104, and a number of configurable media interface modules 106. The host device 102 may be connected to and accessed via a network, such as an Ethernet network, and may provide communication access to the network for any number of external devices of an industrial automation system. The industrial automation system may include a number of devices to facilitate operations of an industrial process. The devices may include controllers, input/output (I/O) modules, motor control centers, motors, human machine interfaces (HMIs), operator interfaces, contactors, starters, sensors, actuators, conveyors, drives, relays, protection devices, switchgear, compressors, firewall, network switches (e.g., Ethernet switches, modular-managed, fixed-managed, service-router, industrial, unmanaged, etc.) and the like.

The host device 102 may be communicatively coupled to the configurable media interface module 106 via any number of data paths. The configurable media interface module 106 may include a number of communication ports 108, 110. The communication ports 108, 110 may couple to one or more external devices to facilitate communication with the host device 102 and/or the network. For example, the configurable media interface module 106 may receive data signals via the communication ports 108, 110 and may communicate data signals between the host device 102, the network, and the external device. In certain embodiments, the communication ports 108, 110 may couple to the same device to provide a redundant connection between the device and the network.

The power conditioner 104 may supply power (e.g., voltage, current) to the host device and/or the configurable media interface module 106. In certain embodiments, the power conditioner 104 may generate and/or receive power from an external power supply and may modify the power based on operational requirements of the host device 102 and/or the configurable media interface module 106. The system 100 may also include a base 105. Any number of host devices 102, any number of power conditioners 104, and/or any number of configurable media interface modules 106 may be mounted on the base 105. In certain embodiments, the base 105 may include any number of connectors to provide a connection between the configurable media interface modules 106 and the host device 102. Additionally or alternatively, the base 105 may include signal routing circuitry to communicate data signals between the host device 102 and the configurable media interface module 106. In some embodiments, the base 105 may also include power circuitry to provide power from the power conditioner 104 to the configurable media interface module 106. A fastener 112 (e.g., a bolt, a screw, an interlocking tab, and so forth) may physically couple the corresponding configurable media interface module 106 to the base 105.

Figure 2:
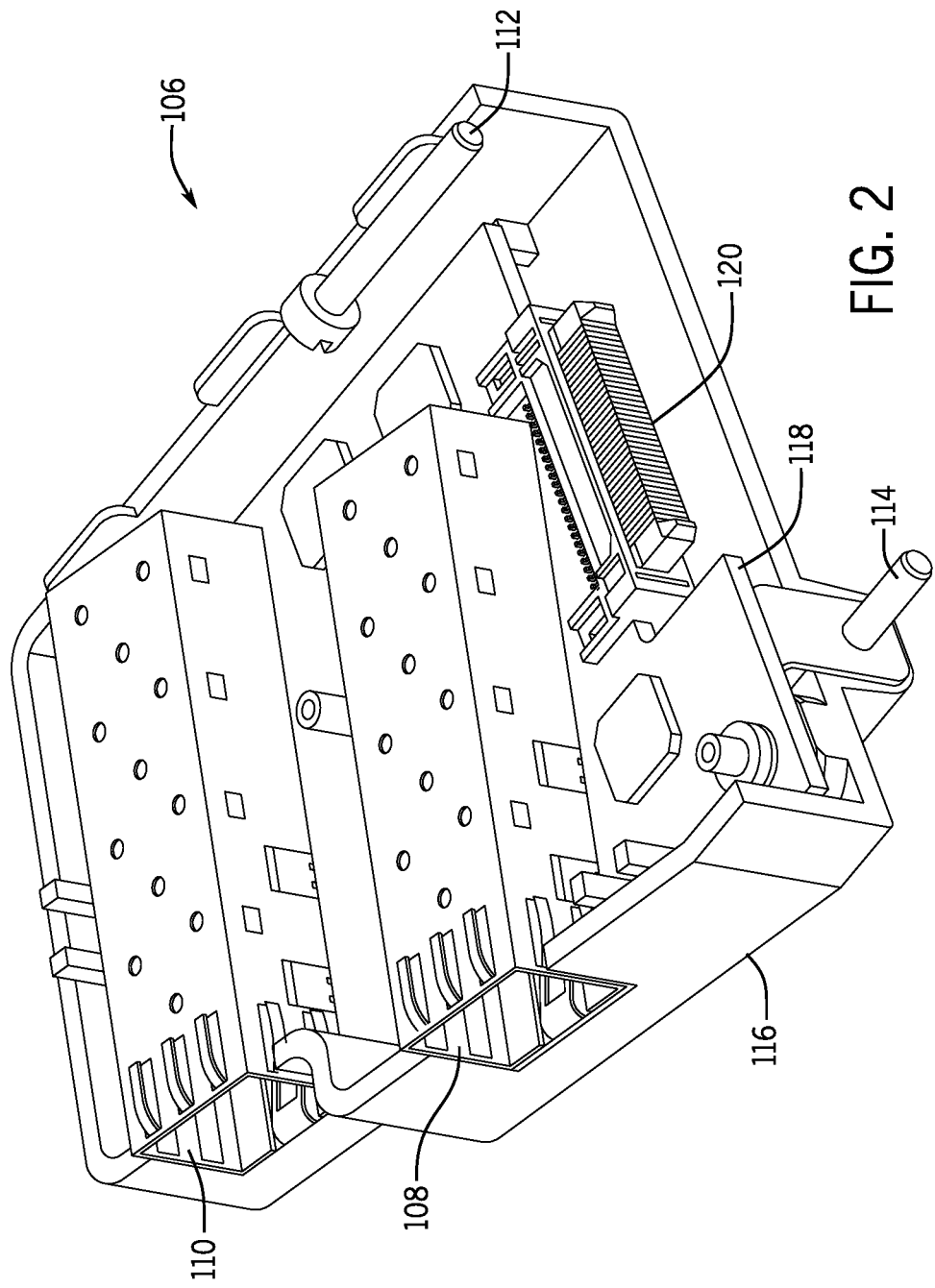
FIG. 2 is a cross-sectional view of the configurable media interface module of FIG. 1, in accordance with embodiments described herein.
Figure 3:
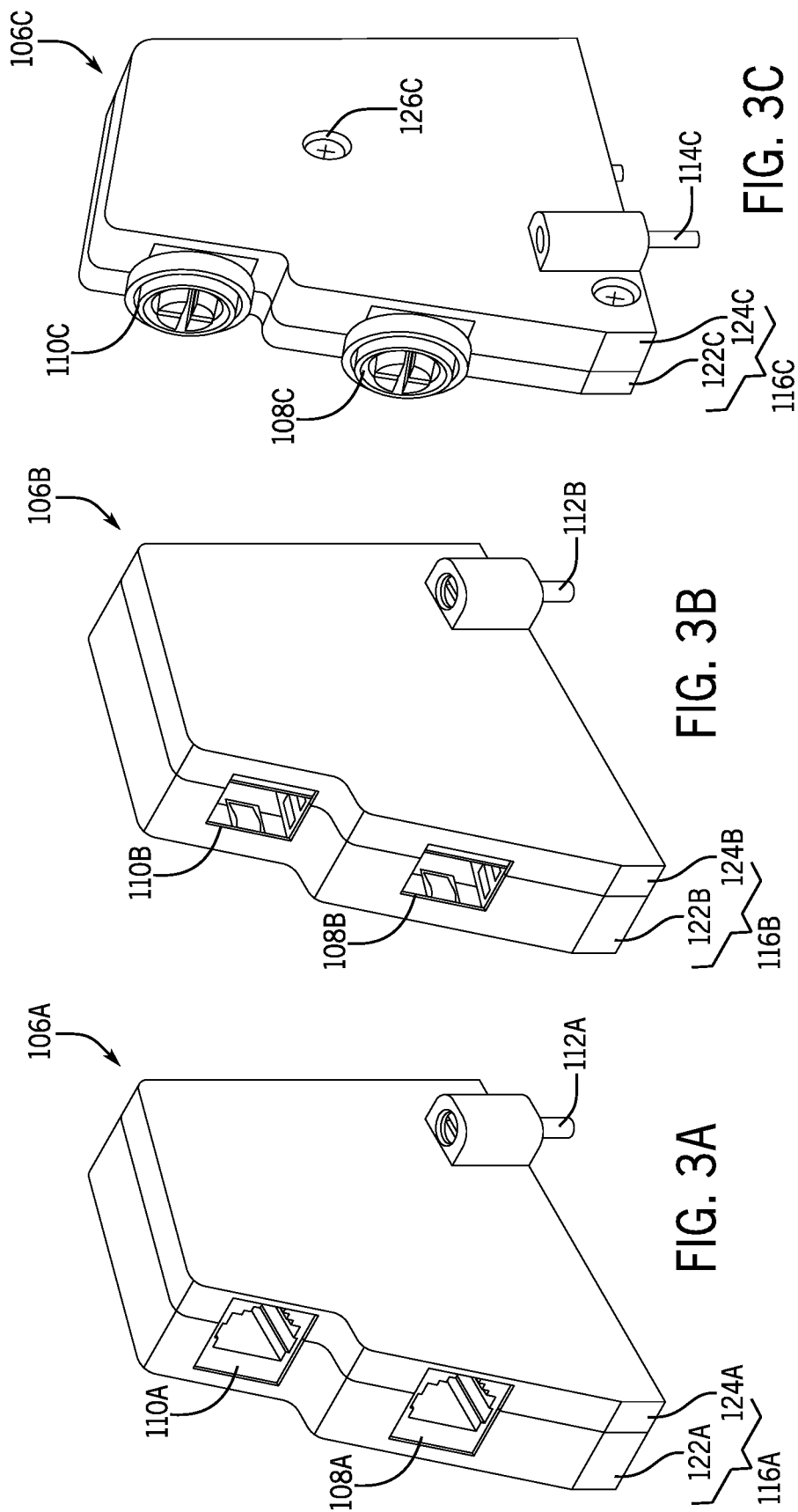
FIG. 3A is a perspective view of a first configurable media interface module, in accordance with embodiments described herein.
FIG. 3B is a perspective view of a second configurable media interface module, in accordance with embodiments described herein.
FIG. 3C is a perspective view of a third configurable media interface module, in accordance with embodiments described herein.

With the foregoing in mind, FIG. 2 illustrates a cross-sectional view of an example embodiment of the configurable media interface module 106 of FIG. 1. The configurable media interface module 106 may include a first communication port 108 and a second communication port 110. In the illustrated embodiment, the first communication port 108 and the second communication port 110 may be Ethernet communication ports and may couple the configurable media interface module 106 to an external device. For example, the first communication port 108 and the second communication port 110 may be registered jack (RJ) communication ports, Ethernet over twisted pair communication ports, small form-factor pluggable communication ports, M12 D coded communication ports, M12 X coded communication ports, and/or any other suitable communication ports. In some embodiments, the first communication port 108 may be the same type of communication port as the second communication port 110. Alternatively, the first communication port 108 may be a different type of communication port from the second communication port 110.

The fastener 112 may couple the configurable media interface module 106 to a base, such as the base 105 in FIG. 1. An attenuation latch (e.g., screw, bolt, pin, and so forth) 114 may be coupled to a housing 116 of the configurable media interface module 106 and may facilitate power management for the system 100 in FIG. 1. In certain embodiments, the attenuation latch 114 may be a pin movable (e.g., rotatable, longitudinally movable, laterally movable, insertable, and so forth) between any number of positions. For example, the attenuation latch 114 may be rotatable (e.g., a quarter turn, a half turn, and so forth) between an unlatched position and a latched position. The configurable media interface module 106 may include circuitry 118 to control operations of the configurable media interface module 106, as described further herein. For example, the circuitry 118 may facilitate communication between one or more connected external devices and the host device 102. Additionally or alternatively, the circuitry 118 may facilitate power management (e.g., power distribution) for the system 100 in FIG. 1, as described further herein. In certain embodiments, different positions of the attenuation latch 114 may correspond to different circuit properties (e.g., resistance, impedance, current, voltage, and/or any other suitable electronic properties) of the circuitry 118. For example, movement of the attenuation latch 114 between the different positions may alter the circuit properties of the circuitry 118 and may result in different modes of operation of the configurable media interface module 106. In some embodiments, the configurable media interface module 106 may include a multi-pin connector 120 to connect to a host device, such as the host device 102 in FIG. 1. For example, the multi-pin connector 120 may connect to a base, such as the base 105 in FIG. 1. The housing 116 may house and retain any number of components, such as the communication ports 108, 110, the circuitry 118, and the multi-pin connector 120 of the configurable media interface module 106.

FIGS. 3A, 3B, and 3C illustrate a number of example embodiments of configurable media interface modules 106A, 106B, 106C. FIG. 3A illustrates a first example embodiment of the configurable media interface module 106A. In the illustrated embodiments, each configurable media interface module 106A, 106B, 106C includes a corresponding first communication port 108A, 108B, 108C and a corresponding second communication port 110A, 110B, 110C. In the illustrated embodiment, the first communication port 108A and the second communication port 110A are Ethernet communication ports, such as a registered jack (RJ) communication port, an Ethernet over twisted pair communication port, and so forth. For example, the communication ports 108A, 108B may receive an 8 position 8 contact connector to connect the configurable media interface module 106A to any number of external devices.

In the illustrated embodiment, the configurable media interface modules 106A, 106B include a fastener (e.g., a screw, a bolt, and so forth) 112A, 112B to couple the configurable media interface module 106A, 106B to a base, such as the base 105 in FIG. 1. Additionally or alternatively, the configurable media interface module 106C may include a corresponding fastener to couple to a base, such as the base 105 in FIG. 1. The configurable media interface modules 106A, 106B, 106C also includes a corresponding housing 116A, 116B, 116C having the corresponding first communication port 108A, 108B, 108C and the corresponding second communication port 110A, 110B, 110C formed therethrough. In the illustrated embodiments, the housing 116A, 116B, 116C is formed of a first portion 122A, 122B, 122C and a second portion 124A, 124B, 124C. While the housing 116A, 116B, 116C is formed of two portions, in some embodiments, the housing 116A, 116B, 116C may be formed of any number of portions or may be a single piece. In certain embodiments, the first portion 122A, 122B, 122C and the second portion 124A, 124B, 124C may be coupled by a fastener (e.g., screw, bolt, interlocking tab, and so forth). In some embodiments, the fastener 112A, 112B may be disposed through a portion of the housing 116A, 116B, 116C and the housing 116A, 116B, 116C may retain the fastener. For example, the housing 116A, 116B, 116C may include a tab extending outwards and having an aperture to receive and retain the fastener 112A, 112B.

FIG. 3B illustrates a second example embodiment of the configurable media interface module 106B. The first communication port 108B and/or the second communication port 110B may be small form-factor pluggable (SFP) communication ports and may couple the configurable media interface module 106B to any number of external devices. FIG. 3C illustrates a third example embodiment of the configurable media interface module 106C. The first communication port 108C and/or the second communication port 110C may be M12 D coded communication ports and/or M12 X coded communication ports and may couple the configurable media interface module 106C to any number of external devices. In certain embodiments, the first portion 122C and the second portion 124C may be coupled by a fastener 126C (e.g., screw, bolt, interlocking tab, and so forth). In the illustrated embodiment, the configurable media interface module 106C includes an attenuation latch 114C. The attenuation latch 114C may be coupled to the housing 116C. For example, a tab may be formed on a surface of the housing 116C and may retain the attenuation latch 114C. In some embodiments, the configurable media interface module 106C may monitor a position and/or an orientation of the attenuation latch 114C. For example, the configurable media interface module 106C may detect a position and/or an orientation of the attenuation latch 114C and may generate a signal based on the detected position and/or orientation. The attenuation latch 114C may be movable between a latched position and an unlatched position. In the latched position, the configurable media interface module 106C may generate and/or transmit a signal corresponding to a request to provide power. In the unlatched position, the configurable media interface module 106C may generate and/or transmit a signal corresponding to a request to shut off power.

While each configurable media interface module 106A, 106B, 106C include a pair of identical Ethernet communication ports, the configurable media interface modules may include different types of Ethernet communication ports. For example, the first communication port 108 may be any of an RJ communication port, an Ethernet over twisted pair communication port, a small form-factor pluggable communication port, an M12 D coded communication port, an M12 X coded communication port, or any other suitable Ethernet communication port and the second communication port 110 may be any of an RJ communication port, an Ethernet over twisted pair communication port, a small form-factor pluggable communication port, an M12 D coded communication port, an M12 X coded communication port, or any other suitable Ethernet communication port.

Figure 4:
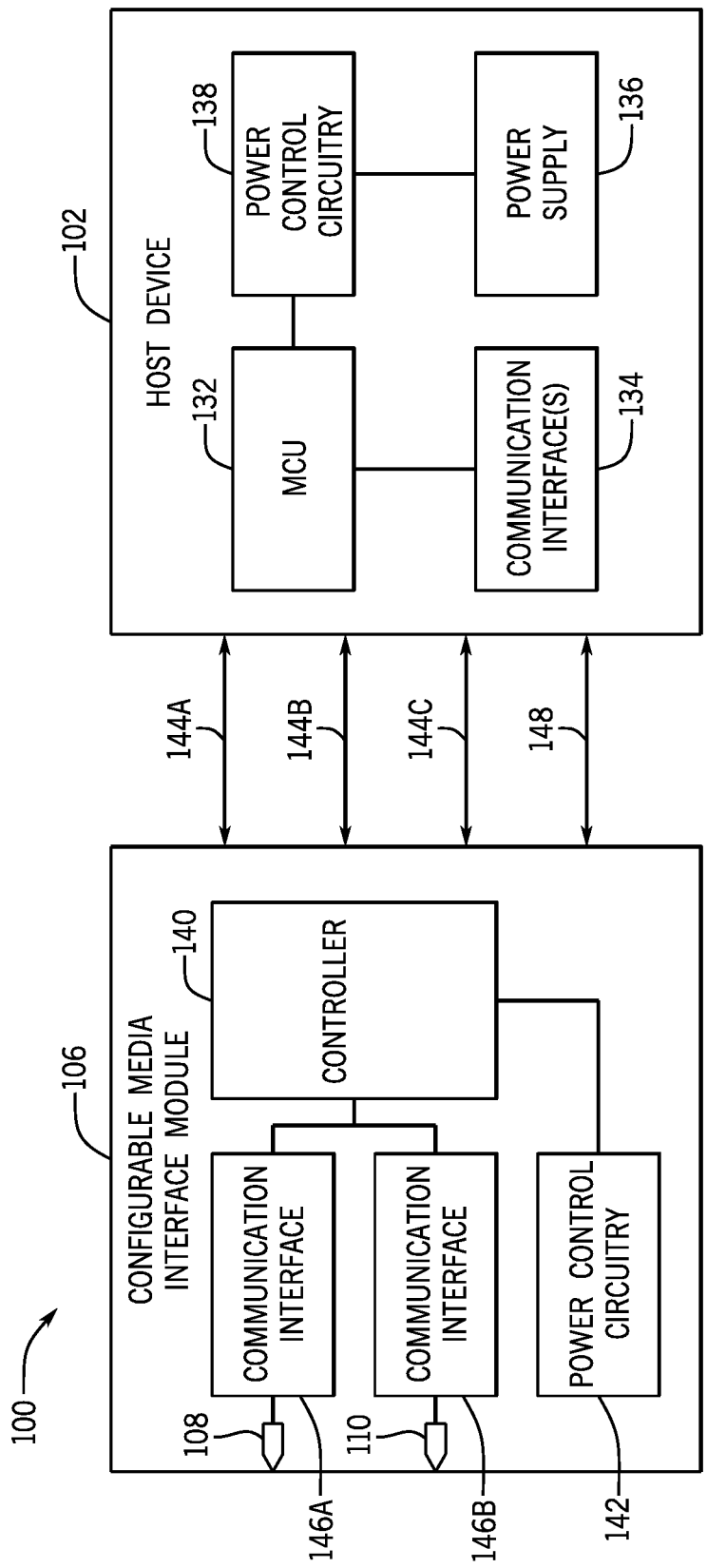
FIG. 4 is a block diagram of the system of FIG. 1 including the configurable media interface module of FIG. 1, in accordance with embodiments described herein.

With the foregoing in mind, FIG. 4 illustrates a block diagram of the system 100 of FIG. 1 including the host device 102 and the configurable media interface module 106. The host device 102 may include a microcontroller unit (MCU) 132 and the MCU 132 may control setup and configuration of the configurable media interface module 106. The host device 102 may include one or more communication interface(s) 134, such as an Ethernet communication interface or other network communication interface. The MCU 132 may generate and/or translate one or more signals and the host device 102 may transmit and/or receive the signals in a communication protocol via the one or more communication interface(s) 134. For example, the host device 102 may transmit and/or receive signals in an Ethernet communication protocol to and/or from the configurable media interface module 106. The host device 102 may also include a power supply 136 and may supply power to the configurable media interface module 106 via a transmission line 148. In some embodiments, the transmission line 148 may be located in a base connected to the host device 102 and the configurable media interface module 106, such as the base 105 in FIG. 1. The MCU 132 may be communicatively coupled to power control circuitry 138 to facilitate power management to the configurable media interface module 106. In some embodiments, the power control circuitry 138 may include one or more voltage regulators, one or more load switches, one or more power converters, one or more sensors, and any other suitable power control circuitry.

In certain embodiments, the MCU 132 may include one or more processors and one or more memories. The one or more processors may include one or more general purpose microprocessors, one or more application specific processors, one or more application specific integrated circuits (ASICs), one or more field programmable gate arrays (FPGAs), or any combination thereof. Additionally or alternatively, the one or more memories may include one or more tangible, non-transitory, computer-readable media that store instructions executable by the one or more processors and/or data to be processed by the one or more processors. For example, the one or more memories may include random access memory (RAM), read only memory (ROM, rewritable non-volatile memory, such as flash memory, hard drives, optical discs, and/or the like.

The configurable media interface module 106 may include a controller 140, or other suitable control circuitry (e.g., processor), and the controller 140 may facilitate communication between one or more external devices connected to one or more of the communication ports 108, 110 and the host device 102. The communication ports 108, 110 may include communication interfaces 146A, 146B to transmit and/or receive signals from the one or more external devices. For example, the controller 140 may generate and/or translate one or more signals and the configurable media interface module 106 may transmit and/or receive the signals in a communication protocol via the communication interfaces 146A, 146B and the corresponding communication ports 108, 110. The communication interfaces 146A, 146B may transmit and/or receive signals in any suitable communication protocol, such as an Ethernet communication protocol. In certain embodiments, the controller 140 may include one or more processors and one or more memories. The one or more processors may include one or more general purpose microprocessors, one or more application specific processors, one or more application specific integrated circuits (ASICs), one or more field programmable gate arrays (FPGAs), or any combination thereof. Additionally or alternatively, the one or more memories may include one or more tangible, non-transitory, computer-readable media that store instructions executable by the one or more processors and/or data to be processed by the one or more processors. For example, the one or more memories may include random access memory (RAM), read only memory (ROM, rewritable non-volatile memory, such as flash memory, hard drives, optical discs, and/or the like The configurable media interface module 106 may also include power control circuitry 142 to receive power from the transmission line 148 and facilitate power management for the configurable media interface module 106. The power control circuitry 142 may include one or more load switches, one or more power converters, one or more power transmission lines, and so forth. The system 100 may also include any number of transmission paths 144A, 144B, 144C to facilitate communication between the host device 102 and the configurable media interface module 106. The first transmission path 144A may be a serial gigabit media-independent interface (SGMII) data path and may facilitate transmission of data packets (e.g., Ethernet data packet) between the host device 102, the configurable media interface module 106, and/or an external device connected to the configurable media interface module 106. The first transmission path 144A may facilitate automatic negotiation and/or automatic mode detection between the host device 102 and the configurable media interface module 106 to establish a communication link. For example, a MAC of the host device 102 and a PHY of the configurable media interface module 106 may select common transmission parameters, such as speed, duplex mode, and any other suitable transmission parameters. The second transmission path 144B may be a Multipoint Low Voltage Differential Signaling (MLVDS) control path and may facilitate transmission of control signals between the host device 102 and the configurable media interface module 106. The third transmission path 144C may be a sideband signal and may facilitate transmission of handshakes (e.g., for automatic negotiation) between the host device 102 and the configurable media interface module 106.

The configurable media interface module 106 may generate and/or transmit a request to supply power to the configurable media interface module 106. For example, when the configurable media interface module 106 connects to the base 105, the controller 140 may generate and/or transmit a signal corresponding to the request to the host device 102. In certain embodiments, the host device 102 may receive the request and may generate an instruction to supply power to the configurable media interface module 106. For example, the MCU 132 may instruct the power supply 136 and/or the power control circuitry 138 to provide power to the configurable media interface module 106. In some embodiments, the configurable media interface module 106 may generate and/or transmit a redundant signal corresponding to the request to the host device 102. If the host device 102 receives either signal, the MCU 132 may provide power to the configurable media interface module 106 via the power supply 136 and/or the power control circuitry 138.

The configurable media interface module 106 may also facilitate power management. For example, the controller 140 may detect and/or monitor position and/or movement of an attenuation latch, such as the attenuation latch 114, via a sensor. The controller 140 may generate and/or transmit an instruction to the power control circuitry 142 to perform a power up sequence based on detecting the attenuation latch 114 is in the latched position. The power control circuitry 142 may receive the instruction and may provide power to components of the configurable media interface module 106 to facilitate communication between the configurable media interface module 106 and the host device 102. For example, the power control circuitry 142 may supply power to any number of power transmission lines (e.g., power rails).

After power is provided to the configurable media interface module 106, the MCU 132 and the controller 140 may perform operations to establish a communication session between the host device 102, the configurable media interface module 106, and one or more external devices connected to the configurable media interface module 106 via the communication ports 108, 110. For example, an external device may be connected to the configurable media interface module 106 via one or both of the communication ports 108, 110. The controller 140 may generate and/or transmit a request to the external device to retrieve information. For example, the controller 140 may receive and/or retrieve information related to a supported communication protocol for the external device, communication configuration information (e.g., media access control (MAC) address), and any other suitable configuration information. Additionally or alternatively, the controller 140 may receive and/or retrieve additional information corresponding to the communication port types of the configurable media interface module 106. For example, a product code corresponding to one or more of the communication ports 108, 110 may be stored in a memory of the configurable media interface module 106. The controller 140 may determine a corresponding communication port type (e.g., 8P8C connector, SFP, M12 D code, M12 X code, and so forth) for the first communication port 108, the second communication port 110, or both. Additionally or alternatively, the product code may also provide a certificate for authentication of the configurable media interface module 106. For example, the host device 102 may receive the product code and may authenticate the configurable media interface module 106 based on data stored on a database, in internal storage, or the like. The host device 102 may also determine configuration parameters for the configurable media interface module 106 and establish a communication link with the configurable media interface module 106 based on the authentication.

In certain embodiments, the configurable media interface module 106 (e.g., the controller 140) may transmit the information to the host device 102. For example, the controller 140 may transmit the communication port types via the second transmission path 144B (e.g., the MLVDS transmission path) and may transmit a request to the host device 102 to configure the configurable media interface module 106. The configurable media interface module 106 may include a PHY component to facilitate connection between a MAC of the host device 102 and the media (e.g., fiber optic cable, copper cable, and so forth) coupled to one or more of the communication ports 108, 110. The host device 102 may configure the PHY based on the received information. For example, the host device 102 may configure the PHY to facilitate communication via the one or more communication ports 108, 110. In certain embodiments, the host device 102 may determine the communication port type of each of the communication ports 108, 110 based on the information. As such, the host device 102 may configure the PHY component to support the communication port types of the communication ports 108, 110 and facilitate communication between the host device 102 and the configurable media interface module 106. In some embodiments, the host device 102 may generate and/or transmit an instruction to configure the PHY via the third transmission path 144C.

Additionally or alternatively, the host device 102 may store the received information. In certain embodiments, the host device 102 may periodically generate and/or transmit a request for updated information from the configurable media interface module 106. The host device 102 may receive and/or retrieve the updated information and may determine whether the updated information matches stored information for the configurable media interface module 106. For example, the host device 102 may determine the updated information does not match the stored information. As such, the MCU 132 may generate and/or may transmit a signal to reset the configurable media interface module 106. Additionally or alternatively, the MCU 132 may generate and/or may transmit a signal to reset the configurable media interface module 106 if no information is returned in response to the request.

Figure 5:
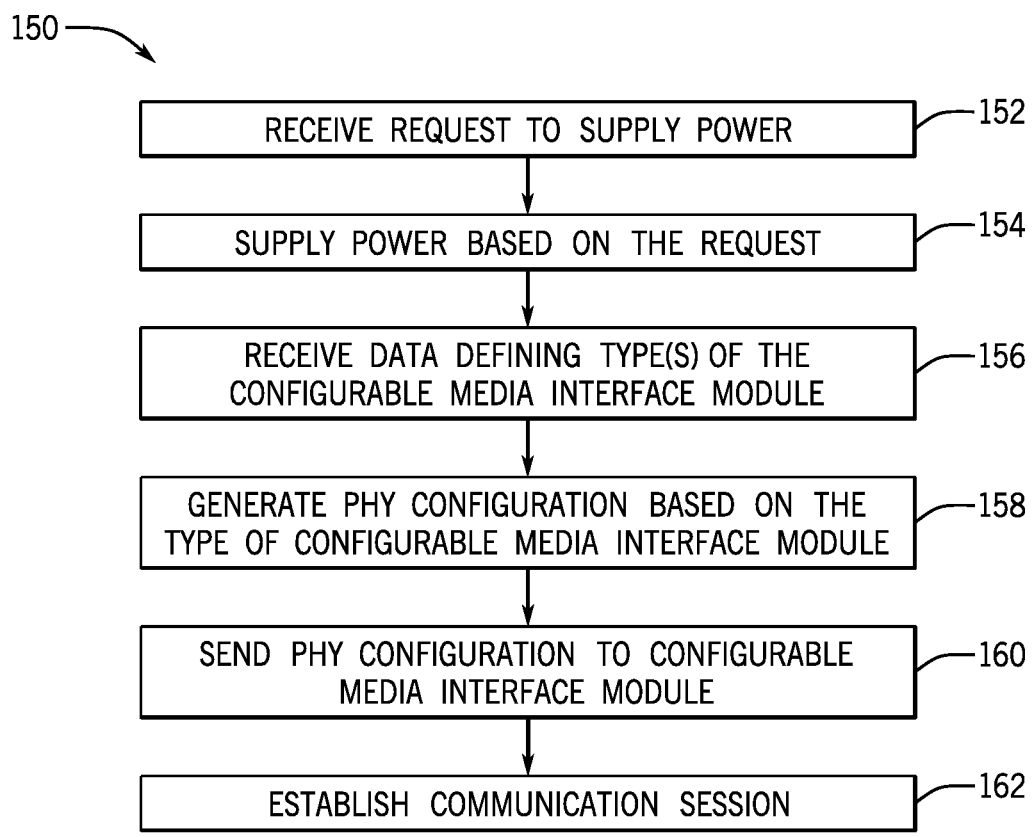
FIG. 5 is a flowchart of a process for setup of the configurable media interface module of FIG. 1, in accordance with embodiments described herein.

With the foregoing in mind, FIG. 5 illustrates a flowchart of a process 150 for configuring the configurable media interface module 106. Although the following description of the process 150 will be discussed as being performed by the MCU 132 of the host device 102, it should be noted that any suitable computing component that may control operations of the host device 102 may perform the process 150. In addition, although the process 150 is described in a particular order, it should be noted that the process 150 may be performed in any suitable order.

At block 152, the MCU 132 may receive a request to supply power to the configurable media interface module 106. For example, the MCU 132 may detect one or more signals from the configurable media interface module 106 corresponding to connection of the configurable media interface module 106 to the base 105 in FIG. 1. In some embodiments, the MCU 132 may detect a physical latch or connection change at a pin or port in which the configurable media interface module 106, the attenuation latch 114, the multi-pin connector 120, or other physical component of the configurable media interface module 106 connects to the base 105. For example, the multi-pin connector 120 may connect to a corresponding port on the base 105 and the MCU 132 may detect the connection to the configurable media interface module 106.

At block 154, the MCU 132 may supply power to the configurable media interface module 106 in response to detecting the request. That is, the MCU 132 may send a command to the power control circuitry 138 or to one or more switching devices (e.g., contactors, relays, MOSFETs, switches) to connect the power to the configurable media interface module 106 via the transmission line 148.

At block 156, the MCU 132 may receive data and/or information associated with the configurable media interface module 106 from the configurable media interface module 106. For example, the MCU 132 may receive information associated with communication ports 108, 110 of the configurable media interface module 106. In certain embodiments, the MCU 132 may receive a product code corresponding to a communication port type for the communication ports 108, 110. The MCU 132 may determine the communication port type based on the product code.

At block 158, the MCU 132 may generate PHY configuration based on the product code (e.g., based on the communication port type). For example, the MCU 132 may generate the PHY configuration based on an 8P8C communication port type, an SFP communication port type, an M12 D code communication port type, an M12 X code communication port type, or any combination thereof. At block 160, the MCU 132 may send the PHY configuration to the configurable media interface module 106. At block 162, the MCU 132 may establish a communication session between the host device 102, the configurable media interface module 106, and/or one or more external devices connected to the configurable media interface module 106 via the communication ports 108, 110.

Figure 6:
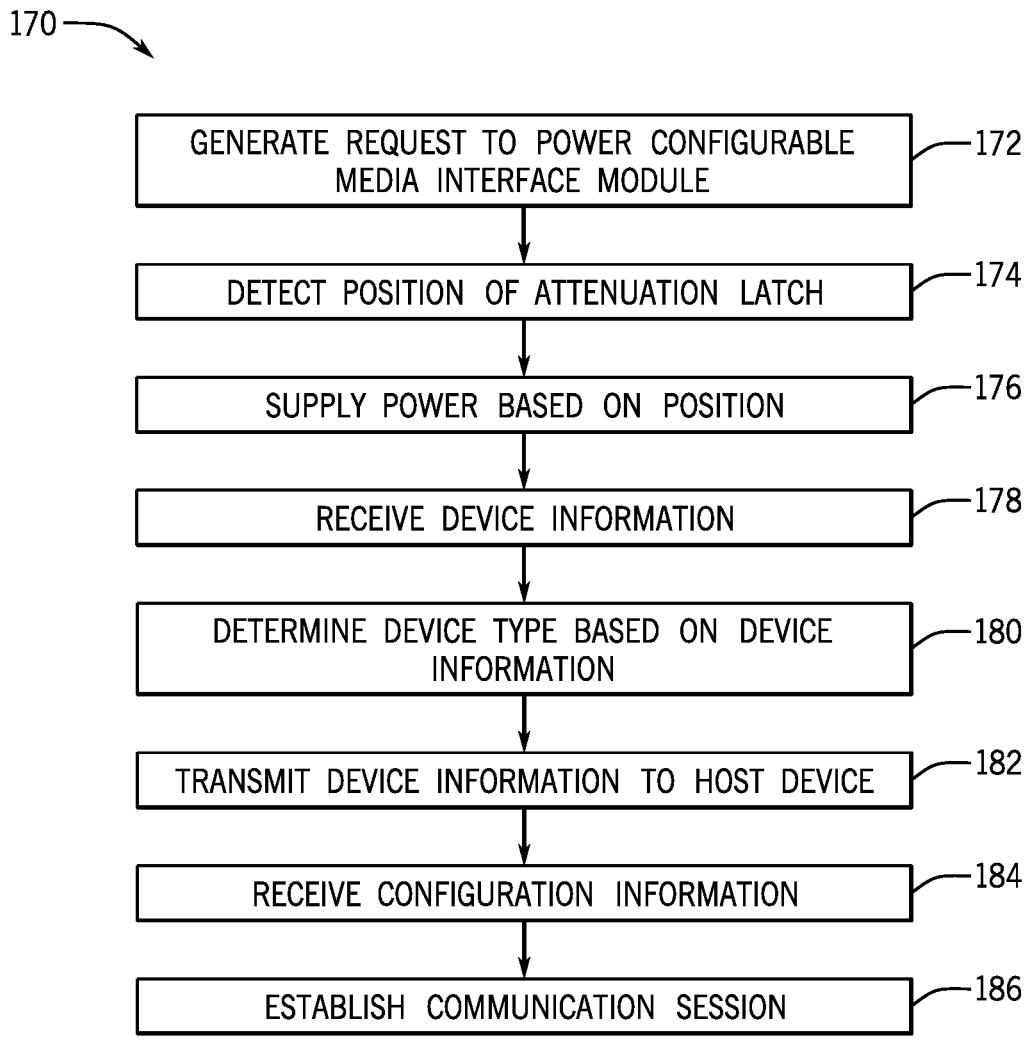
FIG. 6 is a flowchart of a process for establishing a communication session with the configurable media interface module, in accordance with embodiments described herein.

With the foregoing in mind, FIG. 6 illustrates a flowchart of a process 170 for setup of the configurable media interface module 106. Although the following description of the process 170 will be discussed as being performed by the controller 140 of the configurable media interface module 106, it should be noted that any suitable computing component capable of controlling operations of the configurable media interface module 106 may perform the process 170. In addition, although the process 170 is described in a particular order, it should be noted that the process 170 may be performed in any suitable order.

At block 172, the controller 140 may receive power via the base 105 after being connected to the base 105. In some embodiments, the power may be received based on operations performed by the host device 102, as described above with reference to FIG. 5.

After receiving power and initializing, at block 174, the controller 140 may detect a position of the attenuation latch 114. For example, the controller 140 may detect the attenuation latch is in a particular (e.g., a quarter-turn) latched position. Each position of the attenuation latch 114 may correspond to a different power supply request. That is, the configurable media interface module 106 may include a variety of power rails that distribute power (e.g., voltage, current) to different components of the configurable media interface module 106, ports of the configurable media interface module 106, portions of the configurable media interface module 106, and the like. In response to detecting the attenuation latch 114 is in a first latched position (e.g., quarter turn), the controller 140 may supply power (block 176) to one or more rails of the configurable media interface module 106 that correspond to the first latched position. For example, the controller 140 may generate and may transmit an instruction to power control circuitry 142 to provide power to the one or more rails that correspond to the first latched position. As such, power may be supplied to corresponding components of the configurable media interface 106.

At block 178, the controller 140 may receive device information associated with one or more external devices connected to one or more of the communication ports 108, 110. In certain embodiments, the controller 140 may retrieve and/or may receive a product code or other identifying information associated with the external device via the communication ports 108, 110. Additionally or alternatively, the controller 140 may receive and/or may retrieve a stored product code associated with the configurable media interface module 106.

At block 180, the controller 140 may receive and/or may determine a type of device connected to the configurable media interface module 106 based on the received information. For example, the controller 140 may determine the type of device based on the received product code. At block 182, the controller 140 may transmit the device information to the host device 102. For example, the controller 140 may transmit the device information to the MCU 132 of the host device 102. At block 184, the controller 140 may receive configuration information from the MCU 132 of the host device 102. For example, the controller 140 may receive PHY configuration information and may configure the PHY based on the information to facilitate communication between the external device to the host device 102 via the configurable media interface module 106. At block 186, the controller 140 may establish a communication session between the host device 102, the configurable media interface module 106, and/or the external device.

Additionally or alternatively, the controller 140 may detect that the attenuation latch is in the unlatched position. As such, the controller 140 may instruct the power control circuitry to remove power (e.g., via switches) to the one or more rails of the configurable media interface module 106. Accordingly, the controller 140 may remove power to one or more components of the configurable media interface module 106. The configurable media interface module 106 may then be removed (e.g., unplugged) from the base 105, while limiting the likelihood of the components being disrupted from power removal. The MCU 132 may also receive one or more signals indicating the configurable media interface module 106 has been removed from the base 105 and the MCU 132 may instruct the power control circuitry 138 to shut down or disconnect power from the configurable media interface module 106. As such, the system 100 may promote efficient power management for the configurable media interface module.

The present disclosure includes configurable media interface modules for communication in an industrial automation system. The configurable media interface modules may include a configurable PHY component separate from a corresponding MAC component in a host device. The configurable media interface module may facilitate efficient power management and establish communication sessions between a host device and an external device via one or more communication ports. Technical effects of the disclosed techniques include providing interchangeable communication modules to permit hot swapping and/or hot plugging and efficient power management.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing

[a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A system, comprising:
a base;
a computing device configured to couple to the base; and
a media interface module comprising a rotatable pin configured to rotate between a plurality of positions, wherein the media interface module is configured to:
couple to the base;
receive power from the computing device via the base;
detect a position of the rotatable pin;
transmit a first signal to the computing device to supply the power to one or more components of the media interface module in response to detecting that the rotatable pin is in a first position of the plurality of positions based on the position;
transmit a second signal to the computing device to disconnect the power to the one or more components of the media interface module in response to detecting that the rotatable pin is in a second position of the plurality of positions;
transmit a third signal to the computing device to cause the media interface module to operate according to a communication mode of operation in response to detecting that the rotatable pin is in a third position of the plurality of positions, wherein the communication mode corresponds to one or more transmission parameters for communications between the computing device and the media interface module;
in response to receiving the power, transmit device information associated with one or more devices coupled to one or more communication ports of the media interface module to the computing device, wherein the computing device is configured to receive a product code associated with the one or more communication ports, authenticate the media interface module based on the product code, and configure one or more network connections between the media interface module and the computing device based on the device information in response to authenticating the media interface module; and
facilitate one or more communication sessions between the one or more devices and the computing device via the one or more communication ports after the one or more network connections is configured by the computing device.

2. The system of claim 1, wherein the one or more network connections correspond to a PHY of the media interface module.

3. The system of claim 1, wherein the computing device is configured to provide the power in response to the media interface module coupling to the base.

4. The system of claim 1, wherein a first communication port of the one or more communication ports corresponds to a small form-factor pluggable (SFP) communication port.

5. The system of claim 4, wherein a second communication port of the one or more communication ports corresponds to an 8 position 8 contact communication port, a second SFP communication port, an M12 D coded communication port, or an M12 X coded communication port.

6. The system of claim 1, wherein the device information comprises a product code stored in a memory of the media interface module.

7. The system of claim 1, wherein a first communication port of the one or more communication ports corresponds to an 8 position 8 contact (8P8C) communication port.

8. The system of claim 7, wherein a second communication port of the one or more communication ports corresponds to a second 8P8C communication port, a small form-factor pluggable (SFP) communication port, an M12 D coded communication port, or an M12 X coded communication port.

9. A method, comprising:
transmitting power to a media interface module via a base;
receiving a signal indicative of a position of a rotatable pin of the media interface module;
in response to determining that the rotatable pin is in a first position of a plurality of positions, supplying the power to one or more components of the media interface module;
in response to determining that the rotatable pin is in a second position of the plurality of positions, disconnecting the power to the one or more components of the media interface module;
in response to detecting that the rotatable pin is in a third position of the plurality of positions, operating the media interface module according to a communication mode, wherein the communication mode corresponds to one or more transmission parameters for transmitting data between a computing device and the media interface module of operation;
in response to transmitting the power to the media interface module:
receiving device information associated with one or more devices coupled to one or more communication ports of the media interface module; and
sending a certificate for authentication to the computing device;
in response to the computing device authenticating the media interface module based on the certificate for authentication, configuring one or more network connections between the media interface module and the computing device based on the device information; and
establishing one or more communication sessions between the one or more devices and the computing device via the one or more communication ports after the one or more network connections is configured.

10. The method of claim 9, comprising receiving a signal corresponding to the media interface module coupling to the base.

11. The method of claim 10, wherein transmitting power to the media interface module is based on receiving the signal.

12. The method of claim 9, wherein the device information comprises a product code stored in a memory of the media interface module.

13. The method of claim 9, wherein a first communication port of the one or more communication ports corresponds to an 8 position 8 contact (8P8C) communication port.

14. The method of claim 13, wherein a second communication port of the one or more communication ports corresponds to a second 8P8C communication port, a small form-factor pluggable (SFP) communication port, an M12 D coded communication port, or an M12 X coded communication port.

15. A non-transitory, computer-readable medium comprising instructions, that when executed by a processor, are configured to cause the processor to perform actions comprising:

receiving power from a computing device;
detecting a position of a rotatable pin configured to rotate between a plurality of positions;
sending a first signal to the computing device indicative of a request to supply the power to one or more components of a media interface module in response to detecting that the rotatable pin is in a first position of the plurality of positions;
sending a second signal to the computing device indicative of a request to disconnect the power to the one or more components of the media interface module in response to detecting that the rotatable pin is in a second position of the plurality of positions;
sending a third signal to the computing device indicative of a communication mode of operation of the media interface module in response to detecting that the rotatable pin is in a third position of the plurality of positions, wherein the communication mode corresponds to one or more transmission parameters for transmitting data between the computing device and the media interface module;
in response to receiving the power from the computing device, transmitting device information associated with one or more devices coupled to one or more communication ports of the media interface module to the computing device;
transmitting a product code associated with the one or more communication ports to the computing device, wherein the computing device is configured to authenticate the media interface module based on the product code and to configure one or more network connections between the media interface module and the computing device based on the device information; and
facilitating one or more communication sessions between the one or more devices and the computing device via the one or more communication ports after the one or more network connections is configured by the computing device.

16. The non-transitory, computer-readable medium of claim 15, wherein the one or more network connections correspond to a PHY of the media interface module.

17. The non-transitory, computer-readable medium of claim 15, wherein the computing device is configured to provide the power in response to the media interface module coupling to a base.

18. The non-transitory, computer-readable medium of claim 15, wherein a first communication port of the one or more communication ports corresponds to a small form-factor pluggable (SFP) communication port.

19. The non-transitory, computer-readable medium of claim 18, wherein a second communication port of the one or more communication ports corresponds to an 8 position 8 contact communication port, a second SFP communication port, an M12 D coded communication port, or an M12 X coded communication port.

20. The non-transitory, computer-readable medium of claim 15, wherein the device information comprises a product code stored in a memory of the media interface module.

* * * * *